(12) United States Patent
Shaastri (10) Patent No.: US 8,631,037 B2
(45) Date of Patent: Jan. 14, 2014

(54) INFORMATION DELIVERY USING QUERIES AND CHANGEABLE DATABASE CONTAINING QUERIES, ADVISORY INFORMATION, AND FLOW LOGIC

(75) Inventor: Ramesh V. Shaastri, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/465,782

(22) Filed: May 7, 2012

(65) Prior Publication Data

US 2013/0297597 A1  Nov. 7, 2013

(51) Int. Cl.
*G06F 7/00* (2006.01)
(52) U.S. Cl.
USPC .......................................................... 707/781
(58) Field of Classification Search
USPC .......................................................... 707/781
See application file for complete search history.

(56) References Cited

U.S. PATENT DOCUMENTS

2004/0039732 A1* 2/2004 Huang .............................. 707/3
2007/0043702 A1* 2/2007 Lakshminarayanan et al. .. 707/3
2012/0225721 A1* 9/2012 Holder et al. ................... 463/42

* cited by examiner

*Primary Examiner* — Truong Vo (57) ABSTRACT

A data storage system may contain a changeable database that includes: advisory information that includes the content of multiple advisory statements; query information that includes the content of multiple user queries; and flow logic information indicating a sequence for the delivery of the advisory statements and the user queries based on answers to the user queries. A user interface may deliver the user queries and the advisory statements to a user and receive answers in response to the user queries from the user. An information delivery engine that is separate from the changeable database may cause the user interface to deliver the user queries and the advisory statements to the user in a sequence based on the user's answers to the user queries and the flow logic information. This in system may be adopted to troubleshooting equipment, such as an optical network terminal.

21 Claims, 7 Drawing Sheets

PORTION OF XML FILE

. . . .

501 {
```
<state>
  <name>state71</name>
  <condition ACTION="query" MARKUP="highlight"
  BGCOLOR="#ffffcc99">Is link LED, Ethernet LED or data LED
  solid or flashing green?</condition>
  <positive>statea1</positive>
  <negative>state72</negative>
</state>
```
}

503 {
```
<state>
  <name>state72</name>
  <condition ACTION="query">Is ONT by Tellabs?</condition>
  <positive>state73</positive>
  <negative>state721</negative>
</state>
```
}

505 {
```
<state>
  <name>state721</name>
  <condition ACTION="inform">Connect a known working laptop
  to the ONT RJ45 jack</condition>
  <positive>state75</positive>
  <negative></negative>
</state>
```
}

507 {
```
<state>
  <name>state73</name>
  <condition ACTION="query" MARKUP="highlight"
  BGCOLOR="#ffcc99ff">Is link LED or Ethernet LED off?</
  condition>
  <positive>state731</positive>
  <negative>state741p</negative>
</state>
```
}

PORTION OF XML FILE

. . . .

```
<statetable>
 <state>
  <name ACTION="intro">somestate</name>
   <condition>Some Condition</condition>
    <positive>yesstate</positive>
     <control>
      <send type="block" param="state1">destObjName</send>
      <recv>recvObjName</recv>
     </control>
    <negative>nostate</negative>
     <control>
      <send type="async" param="state2">destObjName</send>
      <recv>recvObjName</recv>
     </control>
 </state>
</statetable>
```

INFORMATION DELIVERY USING QUERIES AND CHANGEABLE DATABASE CONTAINING QUERIES, ADVISORY INFORMATION, AND FLOW LOGIC

BACKGROUND

Various endeavors can require a high degree of individual expertise, such as troubleshooting equipment (e.g., an optical network terminal (ONT)). Unfortunately, the training required to develop this expertise can be very costly and time-consuming. Persons having the needed expertise may also not be available in sufficient number for organizations that provide a high volume of equipment troubleshooting, such as an optical network provider.

Computer-based expert systems have been developed to help address these problems. However, such systems can be difficult to program, difficult to use, and difficult to modify to reflect changes in the underlying information.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
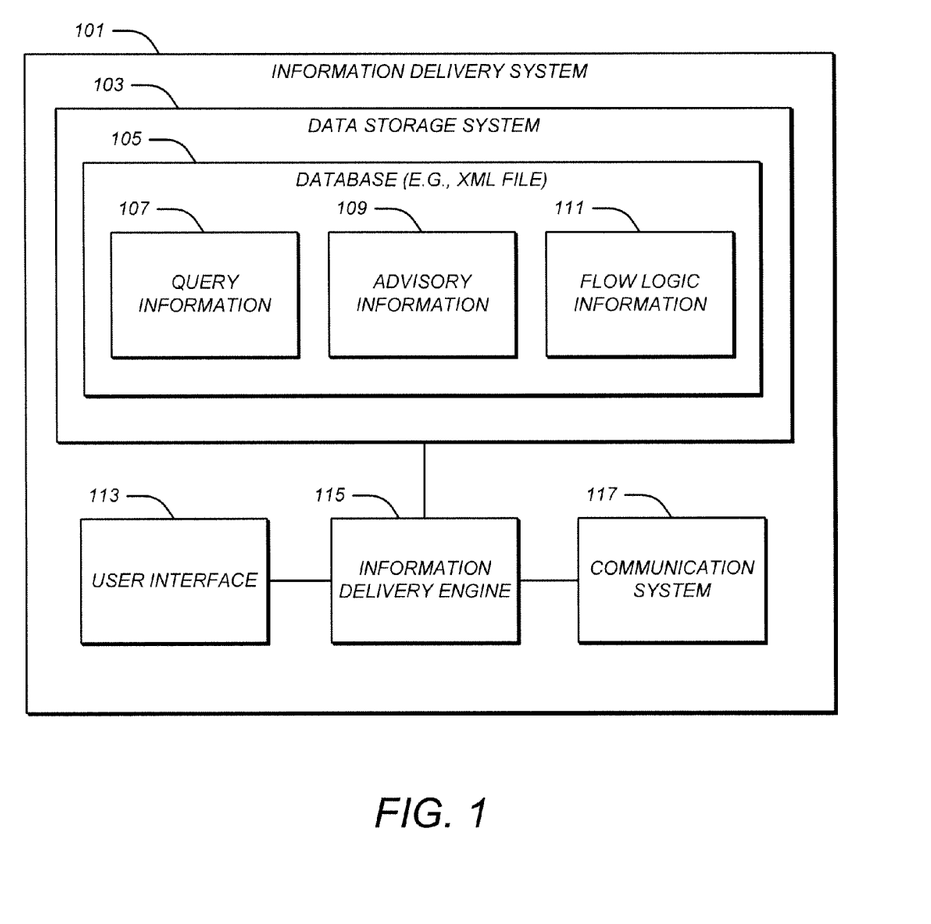
FIG. 1 illustrates an example of an information delivery system using queries and a changeable database containing the queries, information, and flow logic.

FIG. 1 illustrates an example of an information delivery system 101 using queries and a changeable database 105 containing the queries, information, and flow logic. As illustrated in FIG. 1, the information delivery system 101 may include a data storage system 103 containing a database 105 that may include query information 107, advisory information 109, and flow logic information 111. The information delivery system 101 may also include a user interface 113, an information delivery engine 115, and a communication system 117.

The data storage system 103 may be of any type, such as a hard disk drive, RAM, a CD, a flash memory, or any combination of these.

The database 105 that is contained within the data storage system 103 may be in any format. For example, the database may be an XML file, a table, a relational database, or any combination of these.

The query information 107 may include the content of multiple user queries. Each user query may include a question to be asked of a user and two or more answers that a user may select in response. The questions and answers may each be in any format, such as in a text or graphical format, or in a combination of these.

The advisory information 109 may include the content of multiple advisory statements. Each advisory statement may include information to be conveyed to a user. The information may be in any format, such as in a text or graphical format, or in a combination of these.

The flow logic information 111 may indicate a sequence for the delivery of the advisory statements and the user queries based on answers to the user queries. For example, the flow logic information 111 in connection with each user query may include an identification of an advisory statement or other user query that should be delivered to the user in response to each possible answer that a user may select in response to the user query. The flow logic information 111 in connection with each advisory statement may include an identification of a user query or other advisory statement that should be delivered to the user after delivery of the advisory statement.

Although indicated as being separate from the query information 107 and the advisory information 109, the flow logic information 111 may be part of the query information 107 and/or the advisory information 109. For example, each user query in the query information 107 may include flow logic information identifying an advisory statement or another user query that should be delivered to the user in response to each possible answer that the user may select in response to the user query. Similarly, each advisory statement may include logic flow information identifying another advisory statement or user query that should be delivered to the user following the advisory statement.

The information delivery engine 115 may be configured to cause the user interface 113 to deliver the user queries and the advisory statements to the user in a sequence that is based on the user's answers to the user queries and the flow logic information 111. To facilitate this, the information delivery engine 115 may be configured to present the first item in the database 105, or an item in the database 105 that is designated to be presented first to the user, through the user interface 113. The information delivery engine 115 may be configured to thereafter deliver the remaining user queries and advisory statements to the user based on the flow logic information and the user's answers to any user queries that are delivered.

The user interface 113 may be configured to deliver the user queries and the advisory statements to a user and to receive answers in response to the user queries. The user interface 113 may deliver the advisory statements and the user queries in any format, such as in any visual and/or audible format. The user interface 113 may be of any type. For example, the user interface 113 may include a display, a touch screen, a keyboard, a pointing device, a microphone, and/or a sound transducer.

The query information 107, the advisory information 109, and the flow logic information 111 may be configured to provide useful information of any type concerning any matter. For example, this information may be configured to troubleshoot equipment; provide an interactive decision support system (e.g., ensure adherence to rules, compliance, policies, etc); assist in product or service configuration (e.g. select options packages during an automobile purchase); guide users through a product or service order flow (e.g. make sure prerequisites for a purchase are satisfied before the final purchase); and/or assist customer-facing users interact with clients (e.g., provide structured responses for sales order takers, or technical support personnel).

The communication system 117 may be configured to communicate electronically with whatever is the subject of the information, such as equipment that is being troubleshooted. For example, the communication system 117 may be configured to automate the process of obtaining answers to certain queries by, for example, sending the queries in an appropriate format to the equipment. In turn, the equipment may be configured to receive this query and to return the information that is sought by the communication system 117. The communication system 117 may be configured to use the information that it receives in response from the equipment to determine the answers to these queries.

Similarly, the communication system 117 may be configured to automate the repair of equipment by using the content of an advisory statement that flows in response to answers to user queries. The communication system 117 may be configured, for example, to generate a signal or other type of information that is communicated to the equipment and that the equipment has been configured to be used to repair the equipment. For example, an advisory statement may indicate that a configuration setting in equipment needs to be changed. The communication system 117 may utilize this advisory statement to formulate an instruction to the equipment to make this needed configuration setting. In turn, the equipment may be configured to receive such an instruction and to make the necessary configuration change.

User queries and advisory statements in the database 105 that are intended to utilize the automated querying or repair functionality of the communication system 117 may be configured in such a way as to indicate that they are to be processed automatically by the communication system 117. For example such user queries and advisory statements may include a flag or other type of distinguishing indicia indicating that they are to be processed by the communication system 117 in addition to or instead of being delivered to the user.

In some cases, the equipment that is being troubleshooted may already be in communication with other equipment, such as with a computer server. In these cases, the communication system 117 may be configured to communicate with the equipment that is being troubleshooted by communicating through the other equipment, such as with the computer server.

An example of equipment to be troubleshooted is an optical network terminal (ONT).

Figure 2:
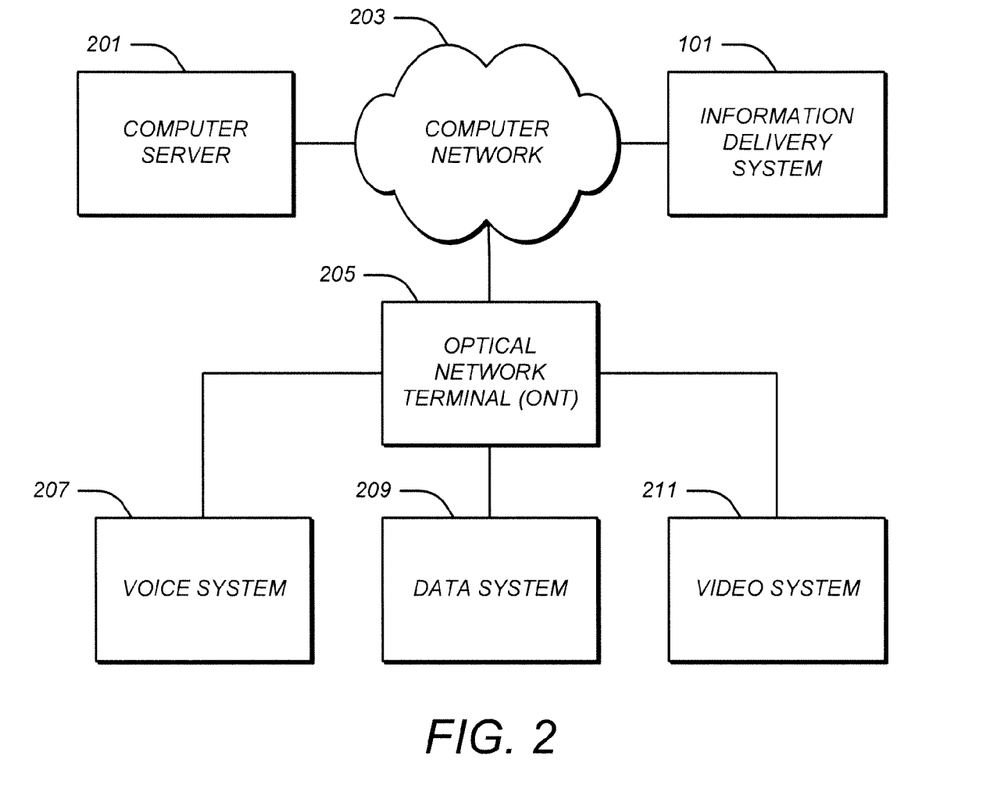
FIG. 2 illustrates an example of a portion of a computer network system that includes an optical network terminal (ONT) and the information delivery system configured to troubleshoot the ONT.

FIG. 2 illustrates an example of a portion of a computer network system that includes an optical network terminal (ONT) 205 and the information delivery system 101 configured to troubleshoot the ONT 205. As illustrated in FIG. 2, the ONT 205 may provide separate connectivity for a voice system 207, a data system 209, and a video system 211. The ONT may communicate with a computer server 201 through a computer network 203. The information delivery system 101, in turn, may communicate with the ONT 205 by communicating with the computer server 201 which, in turn, may communicate with ONT 205 on behalf of the information delivery system 101. As indicated above, these communications may include queries for information and/or repair instructions.

Figure 3:
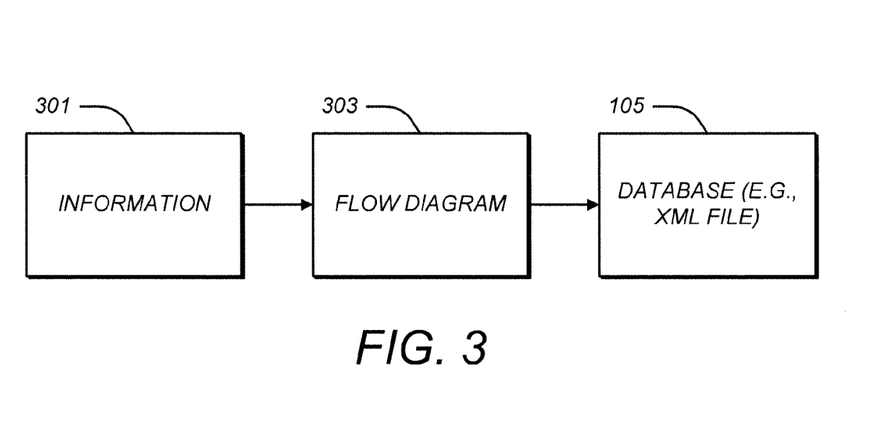
FIG. 3 illustrates an example of a process for generating the database 105 in the information delivery system 101 illustrated in FIG. 1.

FIG. 3 illustrates an example of a process for generating the database 105 in the information delivery system 101 illustrated in FIG. 1. As illustrated in FIG. 3, information 301 may be converted into a flow diagram 303 which may be converted into the database 105.

The information 301 may relate to any type of process that gathers information and delivers information based at least in part on the information that is gathered. The information 301 may also be in any form. For example, the information may be a repair or troubleshooting manual and may include field reports and other information relevant to troubleshooting.

The information 301 may be converted into the flow diagram 303 using any process. For example, a person may gather and study the information 301 and design and construct the flow diagram 303 based on it.

The flow diagram 303 may be in any format. The flow diagram 303 may include a starting point, advisory statements, and user queries. Each of these components in the flow diagram 303 may be indicated in a different way. For example, user queries may be indicated by a diamond-shaped geometric shape, each containing the content of the user query (e.g., the question) and a pointer to the next user query or advisory statement that should be delivered to the user based on each possible answer to the user query. Each advisory statement, on the other hand, may instead be indicated by a rectangular geometric shape with the content of the statement within the rectangle and a pointer to the next user query or advisory statement that should be delivered to the user.

Figure 4:
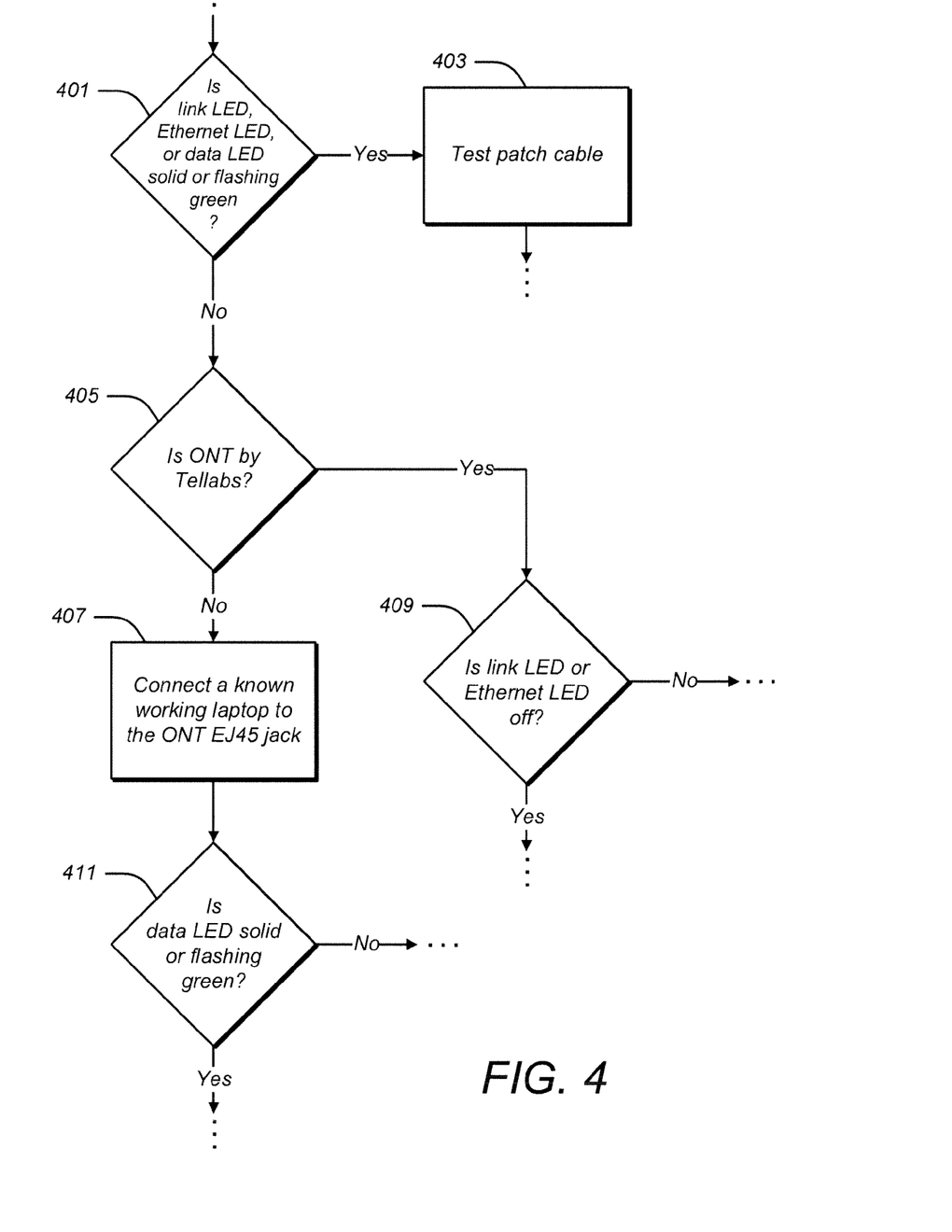
FIG. 4 illustrates an example of a portion of the flow diagram illustrated in FIG. 3.

FIG. 4 illustrates an example of a portion of the flow diagram 303 illustrated in FIG. 3. As can be seen in FIG. 4, the flow diagram 303 may include user queries 401, 405, 409, and 411 and advisory statements 403 and 407.

Figure 5:
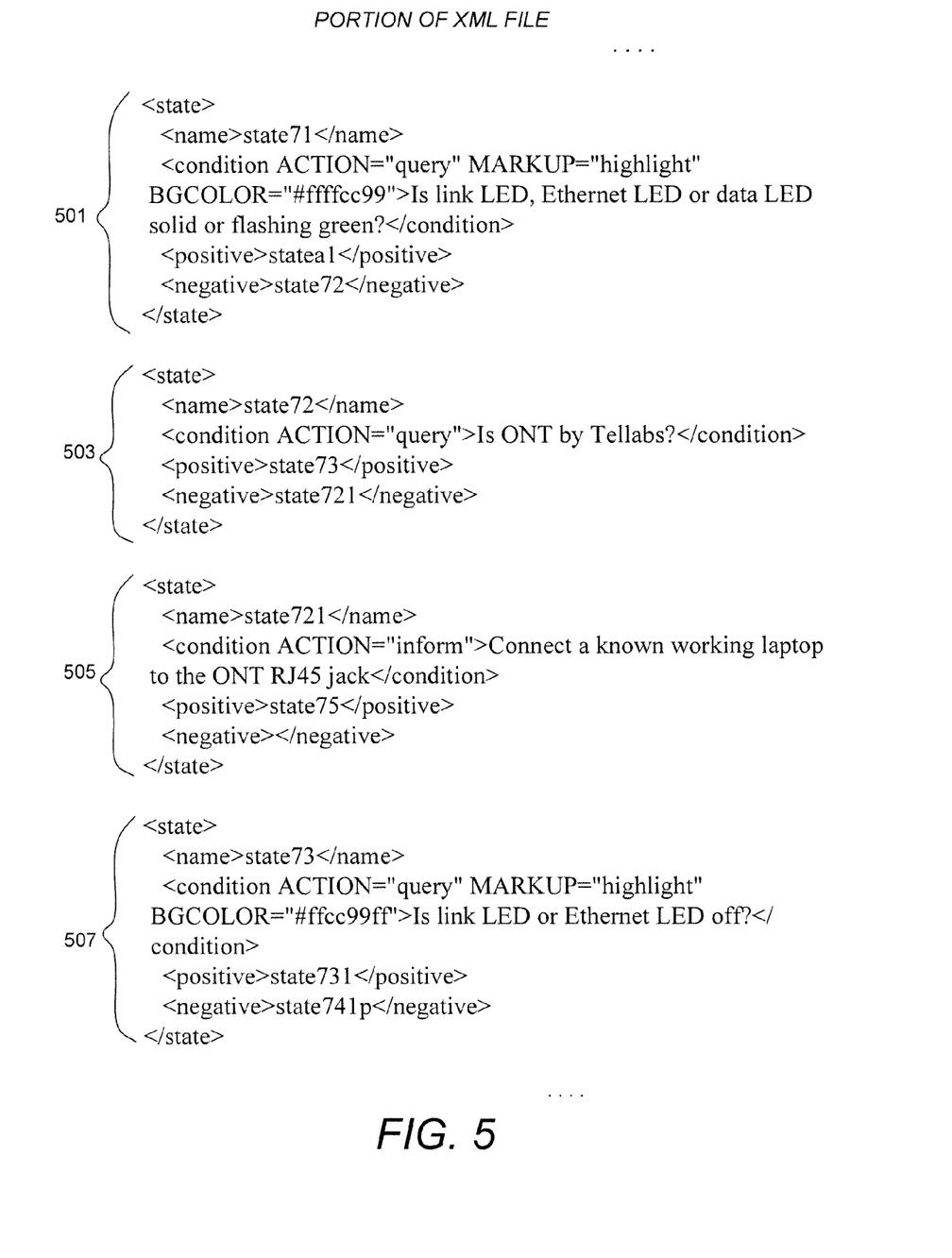
FIG. 5 illustrates an example of a portion of the database illustrated in FIG. 1 in the form of an XML file.

FIG. 5 illustrates an example of a portion of the database 105 illustrated in FIG. 1 in the form of an XML file. Each user query and each advisory statement may constitute an element in the XML file, portions of this being illustrated in FIG. 5. For example, user queries 401, 405, and 409 in FIG. 4 are illustrated as elements 501, 503, and 507, respectively, in FIG. 5. Similarly, advisory statement 407 in FIG. 4 is illustrated as element 505 in FIG. 5.

As also illustrated in FIG. 5, each element may include various sub-elements that delineate different aspects relevant to the main-element. For example, there may be a "name" sub-element that indicates a unique name for the element that can be referenced by other elements.

There may be a "condition" sub-element that specifies the element type, such as whether it is a user query element (designated "query") or an advisory statement element (designated "inform"). Each "condition" sub-element may also contain the content of the question in connection with each user query or the advisory statement in connection with each advisory statement that is to be delivered to the user. Each "condition" element may also include other information indicating the format of the presentation, such as information indicating the size and color of a display font.

One or more other sub-elements within each element may each point by name to the next user query or advisory statement that is to be delivered to the user. In the case of an element containing a user query that can only be answered "yes" or "no," for example, there may be an additional "positive" sub-element for a positive answer and an additional "negative" sub-element for a negative answer that the user might provide. When there are more than two possible answers, additional sub-elements may be added with other distinguishing names and pointers. Although an advisory statement element may only need one sub-element for a pointer to the next advisory statement or user query, the user query set of pointer sub-elements may be presented for consistency, with the "negative" sub-element being empty.

The syntax that is used in the XML file may vary significantly from what is illustrated in FIG. 5. For example, there may be types of elements other than just user query and advisory statements, such as a "transmit" sub-element or a "receive" sub-element. The transmit sub-element may be used for sending commands or instructions to the computer network 203, the computer server 201, the communications system 117, or other devices connected via the computer network and/or computer server. The receive sub-element may be used for receiving a response or status from the computer network 203, the computer server 201, the communications system 117, and/or other devices connected via the computer network and computer server. Although the flow logic information 111 that is relevant to each type of element is included within the element, it might instead be entirely separate. There may also be more levels of sub-elements, such as, for example, to provide rules for how the information delivery engine 115 should handle exceptions to normal processing of an advisory statement, user query, or any other type of information. There may instead be no sub-elements.

Figure 8:
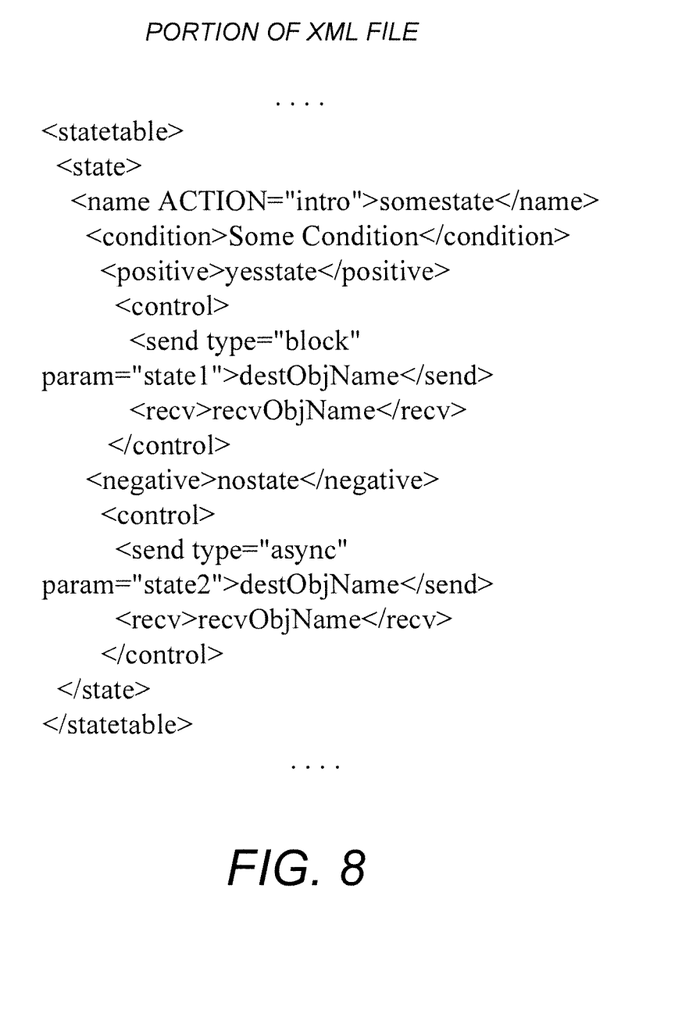
FIG. 8 illustrates another example of a portion of the database illustrated in FIG. 1 in the form of an XML file.

FIG. 8 illustrates another example of a portion of the database illustrated in FIG. 1 in the form of an XML file. As illustrated in FIG. 8, a sub-element "control" may be used to encapsulate other sub-elements called "send" and "recv."

All the elements and sub-elements in the XML file may have one or more attributes. As illustrated in FIG. 8, two attributes may be called "type" and "param" and may be used in the send and recv sub-elements The "control" sub-element may be recognized and acted upon by the information delivery engine 115 to transfer to or acquire control from another application, program, object, method, or subroutine running either locally or remotely. The information delivery engine 115 may be configured to transfer or acquire control before the information delivery engine 115 branches to the state indicated by the "positive" or the "negative" sub-element, respectively.

A "type" attribute may also be specified and may indicate how the information delivery engine 115 should behave while transferring or acquiring control. For instance, a type="block" may indicate that the information delivery engine 115 should wait for a status from the application, program, object, method or subroutine that control is being passed to before continuing with normal processing of the other state elements. Likewise, a type="async" may be specified and indicate that the information delivery engine 115 should transfer control and concurrently continue with normal processing.

Whatever the syntax, the information delivery engine 115 may be configured to read the XML file and deliver the user queries, advisory statements, and any other type of information that it contains to the user through the user interface 113 in accordance with the flow logic information that the XML file also contains and the answers to user queries that the user provides.

Figure 6A:
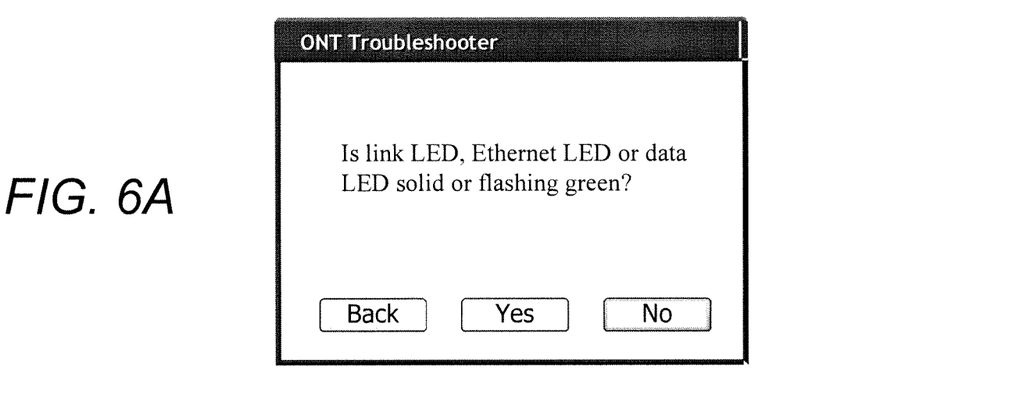
FIGS. 6A-6C illustrate an example of a portion of a sequence of screens that the information delivery engine may be configured to cause to be displayed based on a reading of the database and answers to the user queries.
Figure 6B:
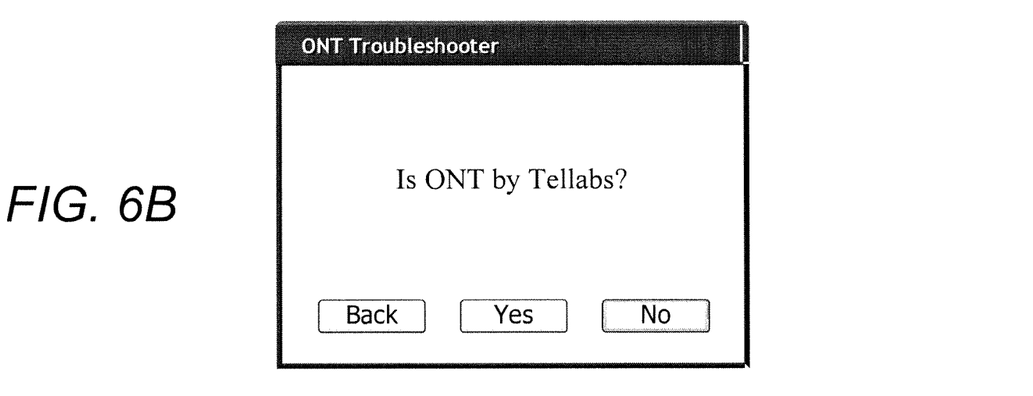
Figure 6C:
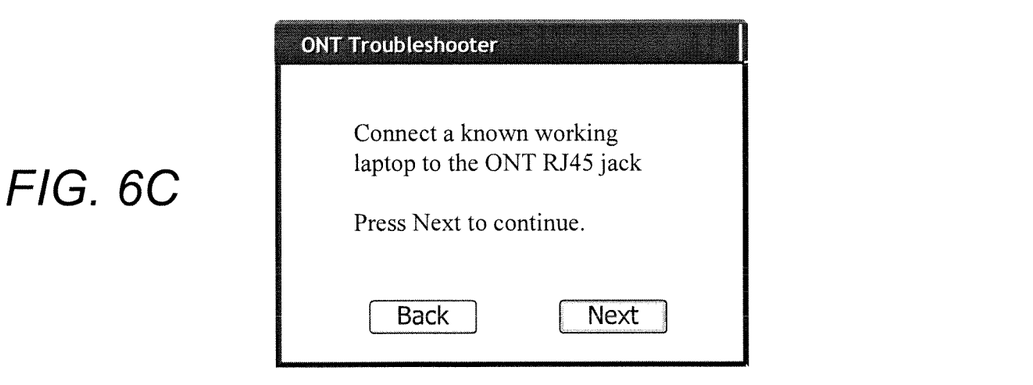

FIGS. 6A-6C illustrate an example of a portion of a sequence of screens that the information delivery engine 115 may be configured to cause to be displayed based on a reading of the database 105 and answers to the user queries. FIG. 6A illustrates the delivery of the user query 501 illustrated in FIG. 5. If the user answers this query by clicking the "No" button in FIG. 6A, the user query 501 dictates that the content of element "state72" (i.e., element 503) should be displayed next. FIG. 6B illustrates the delivery of the element 503, which in this case is a user query element. If the user answers this query by clicking the "No" button in FIG. 6B, user query 503 dictates that the content of element "state721" (i.e., element 505) should be displayed next. FIG. 6C illustrates the delivery of the user query 505 illustrated in FIG. 5. As illustrated in FIG. 5, the flow logic information in the element 505 indicates that the element "state75" (not illustrated in FIG. 5) should be presented next. The sequence may continue to proceed in this manner until the flow logic of a delivered element no longer indicates that the content of another element should be delivered.

As illustrated in FIGS. 6A-6C, each screen may include a "Back" button that may enable a user to go back to a previous screen to review advisory information that was presented and/or to change an answer that was provided. To facilitate this, the information delivery engine 115 may include a data storage system that stores information identifying the entire path traversed by the user during each session and appropriate control logic that can read this information to go back any number of levels. If a different answer is given at any level, the information delivery engine 115 may be configured to revise the information that is stored in the data storage system to reflect this change.

Figure 7:
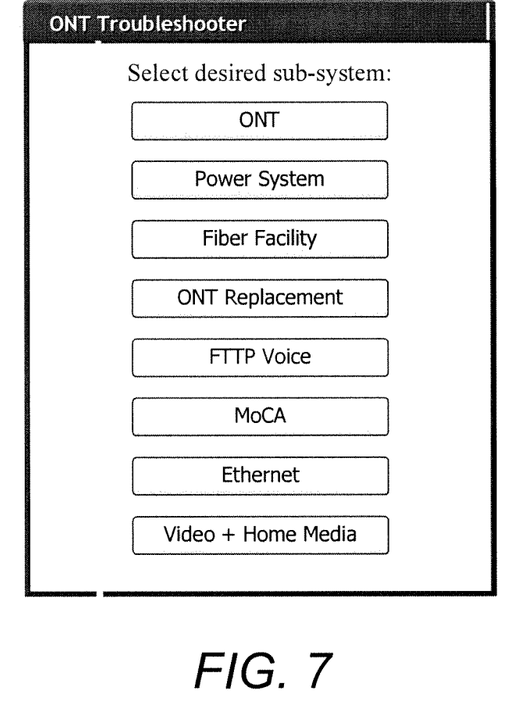
FIG. 7 illustrates an example of a user query that has more than two choices and that can be used to divide the advisory information into different sections.

FIG. 7 illustrates an example of a user query that has more than two choices and that can be used to divide the advisory information into different sections. The user query illustrated in FIG. 7 may be the first element that is delivered to the user. As illustrated in FIG. 7, this first user query may divide the troubleshooting process in sub-sections based on the name of the sub-system to be tested. In connection with an information delivery system that is configured to troubleshoot an ONT, the initial choices may include: "ONT" which may help interpret diagnostic lights on the ONT and troubleshoot problems associated with the various ONT components; "Power System" which may help diagnose and resolve power supply issues at the ONT and with a related Battery Backup Unit (BBU); "Fiber Facility" which may help a technician diagnose and resolve issues with light levels at the ONT, a related Fiber Distribution Terminal (FDT), or a related Fiber Distribution Hub (FDH); "ONT Replacement" which may help a technician diagnose the ONT for failure or replacement, if replacement is warranted; "FTTP Voice" which may assist a technician diagnose and resolve trouble with a customer's voice (phone) line; "MoCA" which may help a technician diagnose and resolve issues related to Multimedia over Coax Alliance (MoCA) signal on a customer's coax line; "Ethernet" which may help a technician troubleshoot and resolve issues related to a customer's data connectivity (e.g., connection to the Internet); and "Video+Home Media" which may assist a technician with video-related issues, such as activation or initialization of a set-top box, quality, or performance, and/or help resolve service related problems, such as Video On Demand and/or a Home Media Manager.

The process of converting the flow diagram 303 into the database 105 may be automated by a program of instructions running in a computer system. The program may include instructions that identify each advisory statement and each user query in the flow diagram, and the connecting links between them. The program may include instructions that convert each identified component into corresponding query information 107, advisory information 109, and flow logic information 111 in the database 105, such as an XML file in the format that is illustrated in FIG. 5. To facilitate this, each advisory statement and each user query in the flow diagram may be indicated by a different type of graphic symbol. For example, a rectangular graphic symbol may be used for each advisory statement containing the content of the advisory statement, and a diamond-shaped graphic symbol may be used for each user query containing the question to be asked. The program of instructions may use image recognition technology to recognize and distinguish between user queries and advisory statements, the content of each graphic symbol, and the other graphic symbol(s) to which flow is thereafter transferred. For user queries, the answer to each question that is associated with a flow connection may also be identified and transferred into the database.

Some or all of the information that is needed from the flow diagram may already be available in data format when the flowchart is produced using flowcharting software, such as Visio™. In these situations, image recognition technology may not be needed. Instead, the software that converts the flow diagram into the database may extract the needed information directly from the data format produced by the flowcharting software and reconfigure it to satisfy the needed format of the database 105, such as the XML file format described above.

The process of automating the conversion of a flowchart with sub-elements may entail creating a state diagram with properties to represent the sub-elements and the associated attributes. For instance, Microsoft Visio™ allows flowchart objects to be created with custom properties. An automated program that converts each state in the flowchart to an XML element may additionally read the properties and appropriately convert them to sub-elements or attributes.

The information delivery system (including the information delivery engine 115), the computer server, and the automated flow-chart-to-database converter that have been discussed herein are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

The information delivery system may be part of a desktop computer, a mobile computer (e.g., a smartphone), or any other type of computing device.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system comprising:
a processor;
a data storage device containing a changeable database that includes:
advisory information that includes the content of multiple predefined advisory statements delivered to a user, wherein the predefined advisory statements include advisory information for addressing an issue;
query information that includes the content of multiple user queries delivered to the user; and
flow logic information indicating a sequence for delivery of the predefined advisory statements and the user queries based on answers to the user queries;
a user interface configured to deliver the user queries and the predefined advisory statements to the user and to receive answers in response to the user queries from the user; and
an information delivery engine that is separate from the changeable database and configured to cause the user interface to deliver the user queries and the predefined advisory statements to the user in a sequence based on the user's answers to the delivered user queries and the flow logic information.

2. The system of claim 1 wherein the flow logic information in the changeable database includes for each user query:
an identification of a first advisory statement or a first user query that should be delivered to the user if a previous query is answered a first way by the user; and
an identification of a second advisory statement or a second user query that should be delivered to the user if the previous user query is answered a second way by the user.

3. The system of claim 2 wherein the flow logic information in the changeable database includes for at least one user query an identification of another advisory statement or another user query that should be delivered to the user if the at least one user query is answered a third way by the user.

4. The system of claim 2 wherein the flow logic information in the changeable database includes for each advisory statement an identification of a user query or another advisory statement that should be delivered to the user after delivery of the advisory statement.

5. The system of claim 1 wherein the advisory information, query information, and logic flow information are configured to provide information useful in troubleshooting equipment.

6. The system of claim 5 wherein the equipment includes an optical network terminal (ONT) interface device.

7. The system of claim 5 further comprising a communication system configured to communicate electronically with the equipment.

8. The system of claim 7 wherein:
the equipment includes an optical network terminal (ONT) interface device that is configured to communicate with a computer server; and
the communication system is configured to communicate electronically with the ONT interface device through the computer server.

9. The system of claim 7 wherein the communication system is configured to obtain an answer to at least one of the user queries by communicating electronically with the equipment.

10. The system of claim 7 wherein the information delivery engine is configured to cause at least one of the user queries to be answered by the user through the user interface and at least one of the user queries to be answered by the equipment through communication with the equipment through the communication system.

11. The system of claim 7 wherein the communication system is configured to repair the equipment by communicating electronically with the equipment.

12. The system of claim 1 wherein the changeable database is an XML file.

13. The system of claim 12 wherein each user query and each advisory statement constitutes an element in the XML file.

14. The system of claim 13 wherein the flow logic information for:
each user query is part of the node for that user query; and
each advisory statement is part of the node for that advisory statement.

15. The system of claim 13 wherein each element includes child sub-elements.

16. The system of claim 15 wherein one of the child elements for each element includes information indicative of whether the element contains the user query or the advisory statement.

17. At least one non-transitory, tangible, computer-readable storage medium containing a program of instructions configured for execution by a computer system and a changeable database that is separate from the program of instructions, wherein the database includes:
advisory information that includes the content of multiple predefined advisory statements, wherein the predefined advisory statements include advisory information for addressing an issue;
query information that includes the content of multiple user queries; and
flow logic information indicating a sequence for the delivery of the predefined advisory statements and the user queries based on answers to the user queries;
a user interface configured to deliver the user queries and the predefined advisory statements to the user and to receive answers in response to the user queries from the user; and
an information delivery engine that is separate from the changeable database and configured to cause the user interface to deliver the user queries and the predefine advisory statements to the user in a sequence based on the user's answers to the delivered user queries and the flow logic information.

18. The medium of claim 17 wherein the changeable database is an XML file.

19. The medium of claim 18 wherein each user query and each advisory statement constitutes an element in the XML file.

20. The medium of claim 19 wherein the flow logic information for:
each user query is part of the element for that user query; and
each advisory statement is part of the element for that advisory statement.

21. Non-transitory, tangible, computer-readable storage medium containing a program of instructions configured for execution by a computer system, wherein execution of the program of instructions configures the computer system to automatically convert a flow diagram into an XML file;

the flow diagram stored in a data storage system, the flow diagram including:
  multiple predefined advisory statements, each predefined advisory statement being indicated by a first type of graphic symbol and including advisory information for addressing an issue; and
  multiple user queries, each user query being indicated by a second type of graphic symbol that is different than the first type of graphic symbol;

the XML file resulting from the conversion of the flow diagram containing a separate element for each advisory statement and for each user query.

* * * * *